US008323028B2

(12) United States Patent
Matanhelia

(10) Patent No.: US 8,323,028 B2
(45) Date of Patent: Dec. 4, 2012

(54) ENDOTRAINER

(76) Inventor: Mudit Matanhelia, Chorley (GB)

(*) Notice: Subject to any disclaimer, the term of this patent is extended or adjusted under 35 U.S.C. 154(b) by 867 days.

(21) Appl. No.: 11/863,644

(22) Filed: Sep. 28, 2007

(65) Prior Publication Data

US 2008/0062299 A1  Mar. 13, 2008

(30) Foreign Application Priority Data

Oct. 5, 2006 (GB) .................................. 6196554

(51) Int. Cl.
G09B 23/28 (2006.01)
(52) U.S. Cl. ........................ 434/262; 434/267
(58) Field of Classification Search .......... 434/262–275; 703/7; 318/567; 345/156
See application file for complete search history.

(56) References Cited

U.S. PATENT DOCUMENTS

| 4,944,969 | A  | * | 7/1990  | Usui ............................... 428/14 |
| 5,403,191 | A  |   | 4/1995  | Tuason |
| 5,722,836 | A  |   | 3/1998  | Younker |
| 5,873,732 | A  | * | 2/1999  | Hasson .......................... 434/262 |
| 5,951,301 | A  |   | 9/1999  | Younker |
| 6,512,892 | B1 | * | 1/2003  | Montgomery et al. ........ 396/326 |
| 6,659,776 | B1 |   | 12/2003 | Aumann et al. |
| 7,837,473 | B2 | * | 11/2010 | Koh ............................. 434/262 |
| 2004/0142314 | A1 | | 7/2004 | Hasson |
| 2007/0238081 | A1 | | 10/2007 | Koh |

FOREIGN PATENT DOCUMENTS

| GB | 2318202       | 4/1998  |
| GB | 2318202 A     | 4/1998  |
| WO | WO-96/42076 A1 | 12/1996 |
| WO | WO 97/44768   | 11/1997 |
| WO | WO-97/44768 A1 | 11/1997 |
| WO | WO 02/17277 A1 | 2/2002 |
| WO | WO 2005/083653 | 2/2005 |
| WO | WO-2007/120660 A2 | 10/2007 |

OTHER PUBLICATIONS

"United Kingdom Patent Application GB0619655.4, Official Communication mailed Apr. 3, 2008", 1 pg.

* cited by examiner

Primary Examiner — Timothy A Musselman
(74) Attorney, Agent, or Firm — Garcia-Zamor IP Law; Ruy M. Garcia-Zamor

(57) ABSTRACT

A portable, folding-laptop style endotrainer including: a base defining a work area for endotraining; a camera for viewing said work area; one or both of i) a display screen for displaying an image from said camera said display screen being attached to said base; and ii) a wireless or wired link coupled to said camera for connecting said camera to a display screen; and a fold-up endotraining dashboard, said endotraining dashboard having at least one portal to enable access of a surgical instrument to said work area; and wherein said endotrainer has two configurations, a first, folded configuration in which said endotrainer is folded substantially flat and a second, operational configuration in which said display screen, if present, is unfolded to a viewing position for an operator of said endotrainer and in which said endotraining dashboard is unfolded such that it is displaced away from said base for endotraining.

20 Claims, 8 Drawing Sheets

ENDOTRAINER

RELATED APPLICATION

This application claims priority under 35 U.S.C. 119 from United Kingdom Patent Application Serial No. 0619655.4, filed Oct. 5, 2006, which application is incorporated herein by reference.

The invention relates to a device for healthcare professionals to practice techniques used in endoscopic surgery.

This type of surgery is performed through a so-called keyhole incision, generally using special instruments different to conventional surgical tools, with a camera system to visualise the area on which the surgeon is working inside the body. Surgeons who have been trained in conventional surgery, and new trainees who will be practicing surgery in the future, require special training in using these instruments and camera systems. This training was previously provided during endoscopic surgery by a trained surgeon. Currently, initial training can be provided in specialised centres with dry-lab and wet-lab courses, but it is difficult to continue practicing the skills learnt during the courses.

Endotraining systems have been developed that use a stacking system consisting of a camera and light source, or a webcam and computer but there are disadvantages with these. A stacking system is expensive, bulky and not readily available to trainees, and the webcam-based trainers have a low image quality. Recently, improved endotrainers have also been developed which have an integrated display screen and camera, but these still require and internal light source and are relatively heavy.

Examples of known endotrainers are as follows: The Laparotrainer (www.laparotrainer.com) available from Lina Medical, Denmark; the portable EndoTrainer available from Endo Innovations BV, the Netherlands; the Virtual Laparoscopic Interface available from Immersion Medical, MD, USA; the LapTrainer from Simulab Corp., WA, USA and also their published patents/applications—U.S. Pat. No. 5,951, 301; WO 97/44768; WO 96/42076; the Portable Laparoscopic and Endoscopic Trainers available from 3-D Technical Services, Ohio, USA as described, for example, in U.S. Pat. No. 6,659,776; and US 2004/0142314; the ProMIS system by Haptica Ltd, Dublin, Ireland; the LTS3e from Real Sim Systems; the FLS Trainer Box from the FLS Program; the URO Mentor and other systems from Simbionix USA Corp, OH, USA. Further background prior art can be found in GB 2,318, 202A; U.S. Pat. No. 5,722,836A; U.S. Pat. No. 6,659,776 and U.S. Pat. No. 5,873,732.

We will describe improved endotraining systems which address some of these difficulties.

According to a first aspect of the present invention there is therefore provided a portable, folding-laptop style endotrainer, the endotrainer including: a base defining a work area for endotraining; a camera for viewing said work area; one or both of i) a display screen for displaying an image from said camera said display screen being attached to said base; and ii) a wireless or wired link coupled to said camera for connecting said camera to a display screen; and a fold-up endotraining dashboard, said endotraining dashboard having at least one portal to enable access of a surgical instrument to said work area; and wherein said endotrainer has two configurations, a first, folded configuration in which said endotrainer is folded substantially flat and a second, operational configuration in which said display screen, if present, is unfolded to a viewing position for an operator of said endotrainer and in which said endotraining dashboard is unfolded such that it is displaced away from said base for endotraining.

The inventors have recognised that, contrary to the prejudice in the art, an endotrainer need not be an enclosed device to provide useful training for working inside the body. This enables a departure from conventional designs and, in embodiments, the endotrainer has an appearance similar to a laptop computer, unfolding to provide a substantially open training environment.

In embodiments of such device there is also no need for an internal light source, further simplifying the system and reducing weight.

In embodiments the display screen is hingedly attached to the base and the endotraining member dashboard folds up from the base to provide one, two or more endoscopic surgery training portals displaced away from the work area on the base. In embodiments the endotraining member or dashboard is adjustable and may comprise a plate supported one or a pair of arms hingedly or otherwise attached to the base. In particular one arm may be attached at each side of the base so that the dashboard lies along the front of the base in a folded configuration and unfolds upwards in an arc defined by the arms. Preferably the plate or dashboard is pivotably attached to the arms to allow the height and angle of the portals to be adjusted, and to allow the dashboard to be positioned to lie substantially flat on the base in its folded position. Preferably the endotraining member, plate or dashboard also carries the camera; this is preferably mounted in a fixed position on the member.

Means for displaying an image may comprise a display screen and/or an output from the camera. The display screen may comprise a conventional LCD monitor directly coupled to the camera or some other configuration may be employed. For example the camera may comprise a digital camera and a display screen may form part of a computer system. Optional wired and wireless links to provide a display screen output from the camera in addition or alternatively to the display screen are described later.

Preferably the camera captures video information for display on the screen.

In another aspect the invention provides a portable endotrainer, the endotrainer comprising: a housing enclosing a work area for endotraining said housing having at least one portal to enable access of a surgical instrument to said work area; a camera for viewing said work area; and one or both of i) a display screen for displaying an image from said camera, and ii) a wireless or wired link coupled to said camera for connecting said camera to a display screen; and wherein said housing is translucent or substantially transparent over at least part of an upper surface of said housing and at the sides to allow in light for said camera.

In a still further aspect the invention provides a portable endotrainer, the endotrainer comprising: a base defining a work area for endotraining; and a housing mounted over said base and provided with at least one aperture for endotraining, said housing being open on at least two sides to enable external illumination of said work area; and wherein said endotrainer lacks an internal light source.

In embodiments of this aspect of the invention having the housing open on two or more sides also facilitates manual access to the work area, for example to change the training task. Preferably the housing is open or has windows on three or all sides and has an open top, covered by the screen when folded down.

Thus in a further aspect the invention provides a portable endotrainer, the endotrainer comprising: a housing enclosing a work area for endotraining, said housing having at least one portal to enable access of a surgical instrument to said work area; a camera for viewing said work area; and one or both of i) a display screen for displaying an image from said camera, and ii) a wireless or wired link coupled to said camera for connecting said camera to a display screen; and wherein said display screen is foldably attached to said housing such that, in a folded configuration, said display screen forms at least part of a lid of said housing and such that, in an unfolded configuration for viewing by an operator of said endotrainer said housing is a least partially open at the top to enable operator access to said work area.

In embodiments of this and other previous and later described aspects of the invention the endotrainer lacks an internal light source.

In some preferred embodiments of the above, and also later, described aspects of the invention the camera and/or dashboard is mounted such that it is able to be raised and lowered along an arc, preferably the arc having a centre centred on the work area or movable platform (see below). Thus the camera may be automatically directed. In embodiments the mount employs a telescopic slide.

Embodiments of the Laparotrainer may also be provided with a moveable platform, for example a turntable mounted on the base, the moveable platform defining a plurality of work areas and being moveable to bring a selected one of the work areas into a working (endotraining) position with respect to the one or more portals.

Thus in a further aspect the invention provides a portable endotrainer, the endotrainer including: a housing enclosing a work area for endotraining, said housing having at least one portal to enable access of a surgical instrument to said work area; an internal camera for viewing said work area; one or both of i) a display screen for displaying an image from said camera, and ii) a wireless or wired link coupled to said camera for connecting said camera to a display screen; and a moveable platform, said moveable platform having a plurality of regions each for providing a different endotraining task to an operator of said endotrainer, and wherein said platform is moveable to bring each of said regions into said work area to enable said operator to perform a selected said endotraining task.

In an embodiment the platform is provided with a motor drive and external controls to allow selection of a said region by the operator.

An embodiment of the invention further provides a moveable platform, in particular a disk, bearing a plurality of endotraining tasks, for use with an endotrainer as described above. Preferably the moveable platform or disk has a detachable mount to allow the operator to remove the disk from the endotrainer without tools. For example, the disk may simply be configured to sit on the end of a short shaft provided with a key, flattened surface or other similar means for locking the disk into a defined rotational position. Examples of endotraining tasks which may be provided include lifting and placing an object; suturing; knot tying; cutting and retying tubes and the like.

In a further aspect the invention provides a portable endotrainer, the endotrainer comprising: a housing enclosing a work area for endotraining, said housing having at least one portal to enable access of a surgical instrument to said work area; a camera within said housing for viewing said work area; and one or both of i) a display screen for displaying an image from said camera, and ii) a wireless or wired link coupled to said camera for connecting said camera to a display screen; wherein said camera has a mounting to enable a said direction of said camera to be adjusted with at least one degree of freedom; and wherein said endotrainer further comprises a remote control system to enable an operator undergoing endotraining to control said camera direction from outside said housing.

Preferably the camera mounting enables the camera direction to be adjusted with two degrees of freedom, for example a height above the base and a tilt angle. Optionally an azimuth angle of the camera may be adjusted, and/or a zoom of the camera (either digital or mechanical). Embodiments of this aspect of the invention simulate surgery where, typically, a surgeon will instruct another person acting as camera operator to direct the camera as required.

In embodiments the Laparotrainer housing may have a first, substantially flat top portion and a second, sloping portion at one side, each of these portions having at least one (or preferably at least two) apertures or portals for endotraining. This facilitates use of the endotrainer either sitting or standing. In embodiments the endotrainer has a base which incorporates a drawer for instruments and/or accessories.

As previously mentioned, in each of the above-described aspects of the invention the display screen may be replaced by a wired or wireless connection to the camera to enable the camera to transmit a video signal to a remote display screen. For example the wireless transmitter may comprise a wireless local area network (WLAN) transmitter to enable the signals from the camera to be displayed on a nearby computer screen and/or the wireless transmitter may comprise a low power television signal transmitter to enable the video signal from the camera to be displayed upon a nearby television and/or a direct RF connection may be provided from the camera for a TV. Additionally or alternatively a local or remote analogue or digital (e.g. hard disk) recording facility may be provided.

Thus in other aspects the invention provides a portable endotrainer including a camera with a wired or wireless connection in accordance with one or more of the previously described connection types. In still other aspects of the invention the above-described camera may be omitted and, instead, an additional portal provided to allow an endoscope-type camera to be employed with the endotrainer. Alternatively this may be provided in addition to the above-described camera.

Where an endoscope-type camera is provided, preferably this is of the solid rod type but, unlike conventional endoscopic cameras, a simplified optical system may be provided since there is no need for the endoscopic camera itself to provide a light source for imaging. Thus in a still further aspect the invention provides an endotrainer in combination with an endoscope camera, in which the endoscope camera is configured to conduct light from an imaging type of the endoscope to an image sensor, preferably along a solid rod, preferably in which the endoscope lacks means to transmit light from the image sensor end to the light-collecting end of the endoscope. In a still further aspect the invention provides an endotrainer with a portal for an endoscope-type camera, preferably of the solid rod type, in which the portal is configured to form a tight seal around the endoscope camera such that the endoscope camera can be positioned by an operator and then remains substantially immobile after positioning. This may be achieved by means of a grommet or boot in the portal which allows displacement but after displacement holds the angle of the rod firm, for example by means of a gel or a sand-filled bag or the like.

In embodiments an autofocus system for the camera may be provided. In embodiments this may be implemented by mechanical means, for example a pin and groove mechanism (one of the pin and groove being mounted on the dashboard, the other on the endoscope-type camera).

As previously mentioned, some preferred embodiments of the endotrainer have an external analogue video output from the camera. This output can be used to connect the endotrainer to a TV or projector, to allow the camera image to be viewed on an external monitor/screen at the same time as being viewed on the attached display.

In embodiments of the endotrainer the camera has an external digital output. This may be a USB or Firewire (Registered Trade Mark) output or other digital output. Such an output can allow the camera to be connected to a laptop or desktop computer. Software can be used to capture still images or record video clips from the endotrainer. This stored data can be used for assessment of endotraining tasks performed by the user.

In embodiments the endotrainer additionally or alternatively has a recording and playback facility built into the body of the endotrainer. This may be achieved by the integration of a computer module, which can capture still images and video clips from the camera. This data may be stored on internal memory such as a hard drive, or extracted onto an external storage device, for example a removable storage device such as Flash memory. The data stored may be played back onto the display screen of the endotrainer, or on a laptop or desktop computer. In this way the endotrainer can be used to view live images from the camera while performing endotraining tasks, and can also be used to record and then watch pre-recorded video clips.

In embodiments, the endotrainer may have a 3-dimensional camera system. This may comprise two cameras mounted onto the dashboard. In embodiments the two camera signals may be used directly by a suitable 3D display screen or fed into a 3-dimensional encoder, which may then encode their signals (for example to generate depth information) for display on a display screen, in particular of a type intended for displaying a 3D image. Depending on the display technology, specialised 3D glasses (e.g. polarizer glasses) may be worn to give the user a 3-dimensional image from the cameras, or lenticular display screen technology may be employed.

In a further configuration of the 3-dimensional endotrainer, the two camera signals can be fed into two video projectors. The projectors can be positioned to overlay the two camera signals onto a single screen, and standard 3-dimensional glasses may then be worn to allow the user to view a 3-dimensional image from the camera.

When a 3-dimensional camera system is used, an option may be provided to allow the user to switch between a 3-dimensional image and a 2-dimensional image from one camera and/or to view both images simultaneously on separate displays.

In another aspect there is provided an endotrainer in which the display screen is at the front of the device, mounted, preferably rigidly, or on the dashboard with one or more portals. Preferably the device has a pull out work surface behind the screen.

There is also provided a wall-mounted endotrainer having a pull-out work area at the front, pulling out from a display screen at the rear.

Preferred embodiments of the systems we describe include a rechargeable battery to facilitate operation without access to a power socket.

Features and aspects of the above-described aspects and embodiments of the invention may be combined in any permutation.

These and other aspects of the invention will now be further described, by way of example only, with reference to the accompanying drawings in which:

FIG. 5b shows the details of the endotraining dashboard illustrated in FIG. 5a;

FIG. 6b shows a side view of the laptop style endotrainer illustrated in FIG. 6a;

Broadly we will describe a simple, lightweight training device. This comprises a camera system, a transparent cover to create a workspace, and a DVD player to watch demonstration videos. It also has an integrated flat-screen display, which can be adjusted to any angle, to allow the user to practice while standing up or sitting down. The device is compact, light-weight and user-friendly. The integrated flat-screen display is slim and can be adjusted to any angle. The display can be folded down when not in use, allowing transport of the device. Preferably the camera system is adjustable to view the workspace from any desired angle. The camera system gives a sharp image, reducing strain while practicing.

In one example one side of the box is partly opaque, and the camera system is located under this opaque section. The box is substantially transparent on top, and on the remaining sides, to allow light to enter. A flat-screen display is connected to the camera system, to display an image of the workspace. This display is hinged on the box opposite to the camera, and can be adjusted to any angle. This allows the user to position the screen to give a sharp, clear image, and also allows them to practice while sitting down or standing up. A transparent lid on top of the box is hinged under the screen, and can be opened to allow access to the workspace underneath. The workspace incorporates a rotating motorised platform or Skills Disc (a rotating platform bearing a set of surgical tasks or exercises). The Skills Disc can be rotated using a button panel, allowing various endoscopic surgical skills to be practiced without needing to open the lid. The button panel also controls the camera angle and zoom. There are apertures located on both the horizontal and vertical opaque sections, through which endoscopic surgical instruments can be placed. A DVD player (and/or recorder) is placed in the base of the box, and is coupled to the display screen. This allows the user to watch training demonstrations and also record their own progress. The camera system comprises a bracket and the camera, which can be moved on the bracket to any desired angle and height, controlled manually or by the button panel. This ensures that the camera can always be focused at the centre of the Skills Disc.

We now describe some preferred embodiments in more detail.

Figure 1:
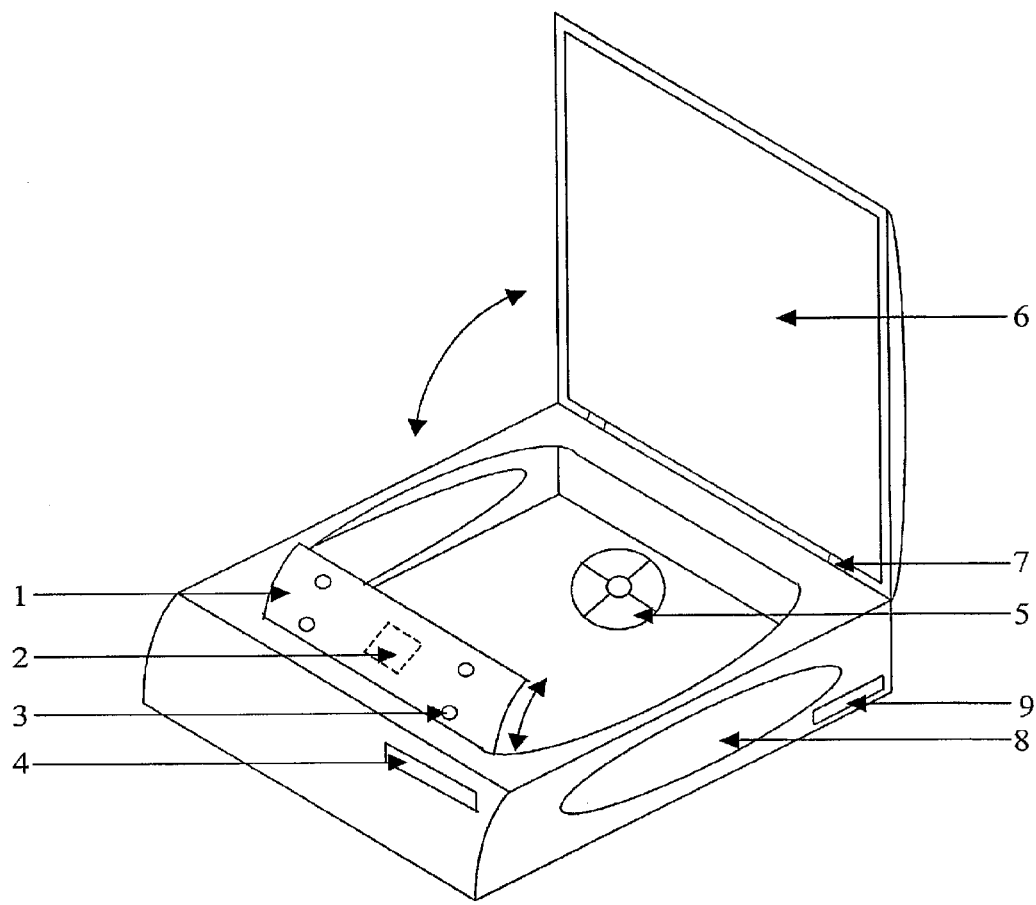
FIG. 1 shows an open-style configuration endotrainer.

FIG. 1 shows an open-style configuration of the endotrainer. The endotraining dashboard (1) is located at one end, and can be raised up when the endotrainer is in use, as shown. The dashboard comprises the camera (2) and apertures (3) through which surgical instruments can be placed. The dashboard can be raised to any desired height to allow the user to train in both a standing and sitting position. It can be raised and lowered manually, or using a motorised system controlled by a user control panel (4). The dashboard is curved to ensure that camera always focuses on the work area, and the user panel can also be used to zoom the camera closer to the work area. The work area may include or consist of a skills disc (5) located on the base of the endotrainer. This disc may be motorised and controlled by the user control panel (4). The camera is coupled to a (flat-panel) display (6) located at the opposite end of the device from the camera. The display is attached (7) so that it can be adjusted to any desired angle, allowing a clear image to be displayed depending on the user's position. When the display is folded open as shown, the endotrainer is substantially open over its top surface. This allows the user access into the work area, and also allows light to enter, which means no integrated light source is needed. Preferably the sides are substantially transparent (8) to allow further light to enter the work area. A DVD player/recorder (9) or alternative media player/recorder may also be integrated into the device, to allow users to watch demonstration videos and record their own progress.

Figure 2:
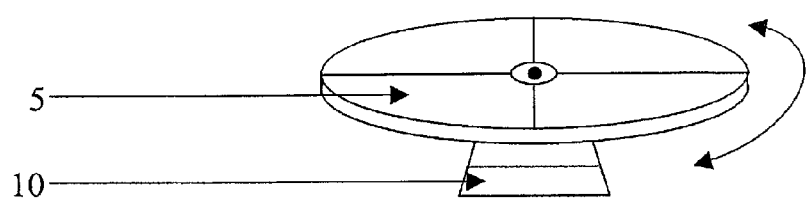
FIG. 2 shows a skills disc which may be used to practice surgical techniques.

FIG. 2 shows the skills disc (5) in more detail. The disc is divided into several areas, each of which can be used to practice a different skill or technique. These may include picking up and placing objects, suturing, and tying knots. The disc is placed on a base (10) on which it can be rotated. This may be done manually, or the disc may be motorised and controlled with the user control panel (4). In embodiments the disc can be removed from its base, and replaced with a further disc which contains different skills to practice.

Figure 3:
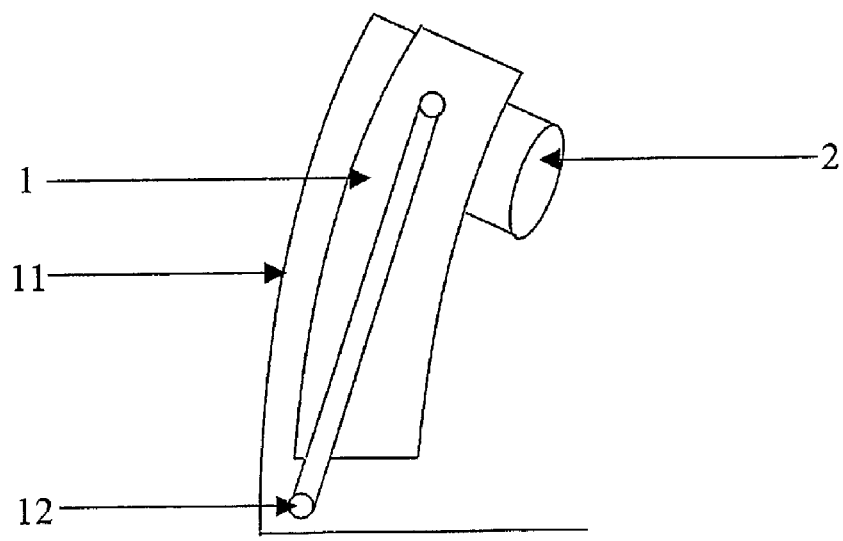
FIG. 3 shows an endotraining dashboard in a resting configuration.

FIG. 3 shows the endotraining dashboard (1) located at the front of the endotrainer (11) and attached (12) to the base of the endotrainer. The camera (2) is located at the top end of the dashboard.

Figure 4:
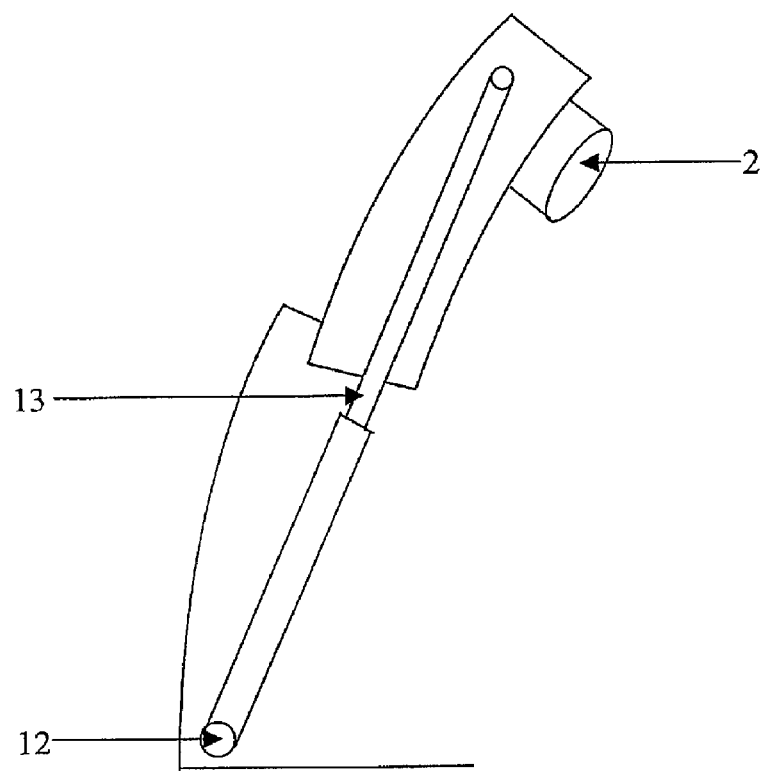
FIG. 4 shows the endotraining dashboard of FIG. 3 in an operational configuration.

FIG. 4 shows the dashboard when in its operational configuration. Here, the dashboard has been raised up on telescopic arms (13). These arms allow the dashboard to be adjusted to any desired height, to enable the user to train either standing up or sitting down. The dashboard rises in an arc, which ensures that the camera (2) is directed towards at the work area at any height. The attachment of the dashboard to the base (12) is hinged to facilitate the arc movement of the dashboard.

Figure 5A:
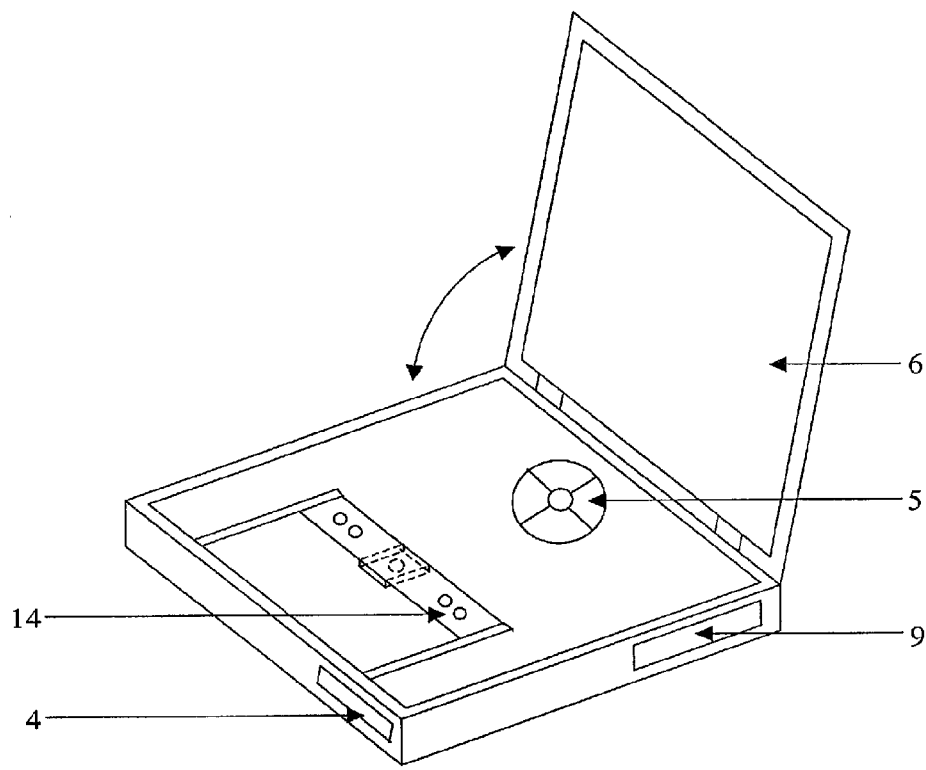
FIG. 5a shows a laptop style configuration endotrainer.

FIG. 5a shows a laptop-style configuration of the endotrainer. Features of the endotrainer described above with reference to FIGS. 1 to 4 may be incorporated into such a laptop style endotrainer.

In FIG. 5a the display (6) is opened and can be adjusted to a desired angle. Once the display is open, a different style of endotraining dashboard (14) can be seen laid flat on the surface of the laptop. The dashboard can be lifted up when the endotrainer is in use. The skills disc (5) is also located on this surface, and a DVD player (9) can be integrated into the base. The laptop-style endotrainer enables the user to work in a completely open environment, without the need for an enclosed box. A user control panel (4) can be incorporated to allow motorised control of the dashboard, skills disc and camera zoom. The laptop-style endotrainer can also incorporate a personal computer, with a small keyboard and mouse being placed on the surface, or an external keyboard and mouse provided. For example, an infrared keyboard or PDA can be incorporated or provided.

Figure 5B:
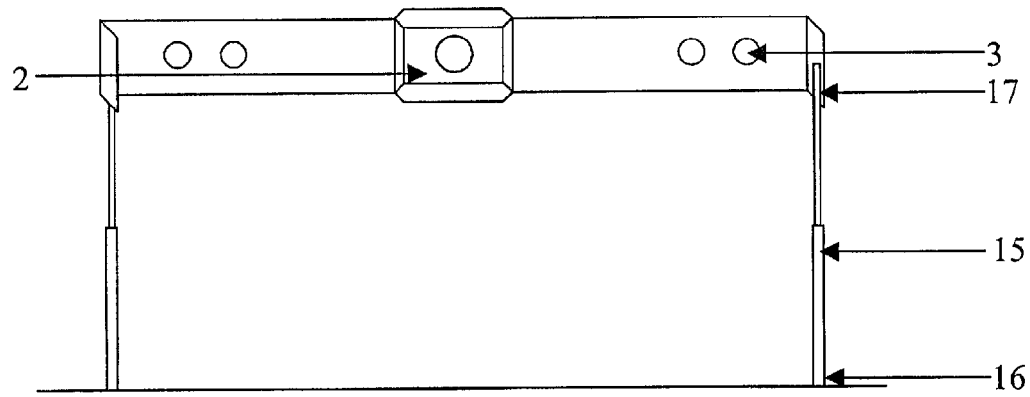

FIG. 5b shows the endotraining dashboard (14) in more detail. When lifted up from the surface of the endotrainer, the dashboard can be adjusted to any desired height on the telescopic arms (15). The telescopic arms are hinged on the base (16) to allow the dashboard to be moved towards and away from the user. Further, the dashboard is hinged at the top of the arms (17) to allow tilting of the dashboard, to allow the camera (2) to be adjusted to focus on the work area. The dashboard contains apertures or portals (3) through which the surgical instruments can be placed and operated.

Figure 6A:
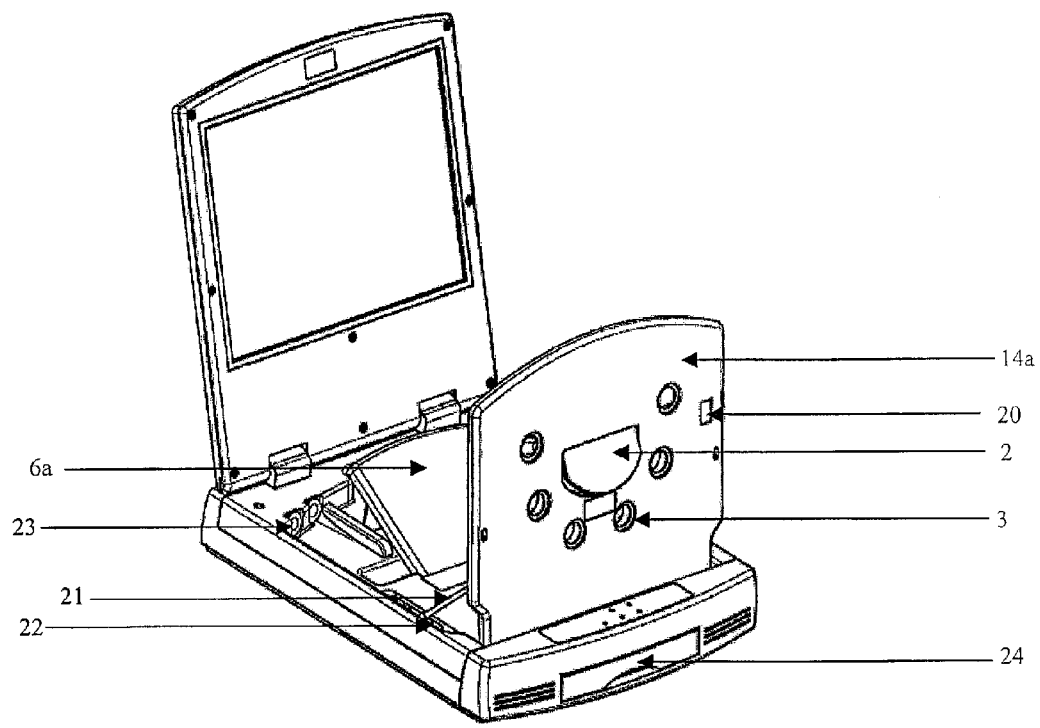
FIG. 6a shows a preferred embodiment of a laptop style endotrainer.

FIG. 6a shows a further, preferred configuration of a laptop-style endotrainer. The endotraining dashboard (14a) is hingedly attached to the base. This is lifted (folded) away from the base to create a workspace. The dashboard has one or more apertures or portals (3) through which surgical instruments are placed and operated. The camera (2) is mounted on the dashboard, and its angle can be adjusted using the wheel (20). The dashboard is supported using locking arms (21) which fix or rest in grooves (22). There may be several grooves, or a single, stepped groove, to allow the dashboard's angle to be adjusted to the user's desired angle. A skills platform (6a) is inserted into a slot in the base to hold it at an angle, or it may be placed horizontally as a tray on the base. Optionally a motor or other means may be provided to rotate the platform. Preferably there are slots or recesses (23) in the base into which (tips of) surgical instruments may be inserted to support them in the dashboard when they are not in use. Preferably there is also a storage drawer for storing the skills platform and other endotraining accessories.

Figure 6B:
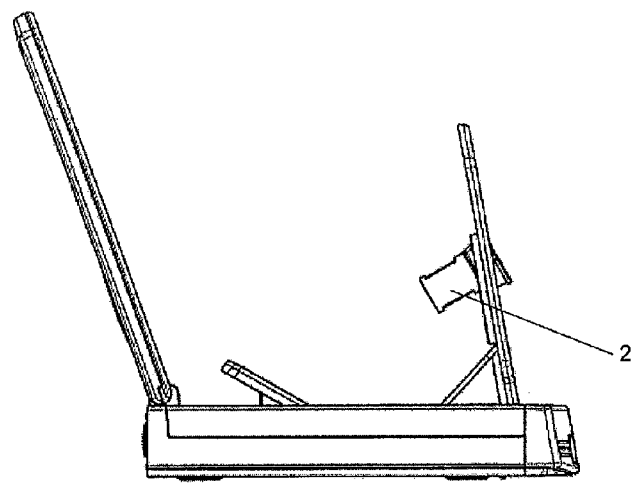

FIG. 6b shows a side-view of the laptop-style endotrainer of FIG. 6a. Here the camera (2) can be seen at an angle pointing towards the skills platform. The camera has a (manual) zoom function to allow the skills platform to be magnified when performing endotraining tasks.

Figure 7:
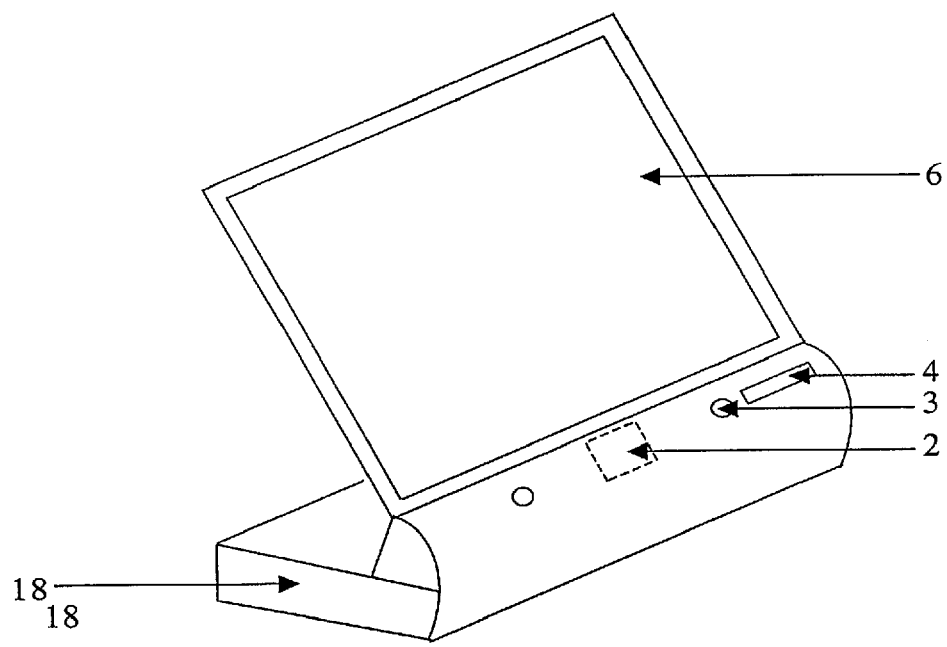
FIGS. 7-9 show a desktop configuration endotrainer.
Figure 8:
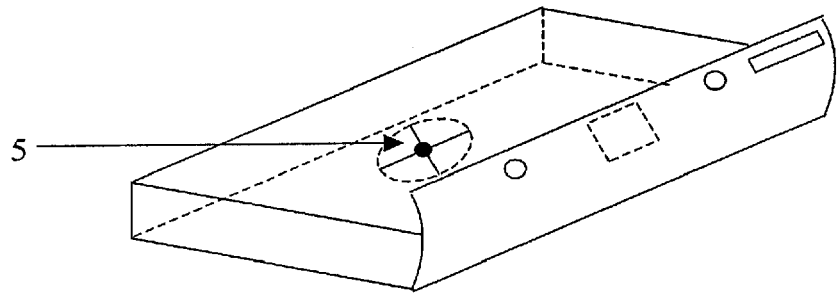
Figure 9:
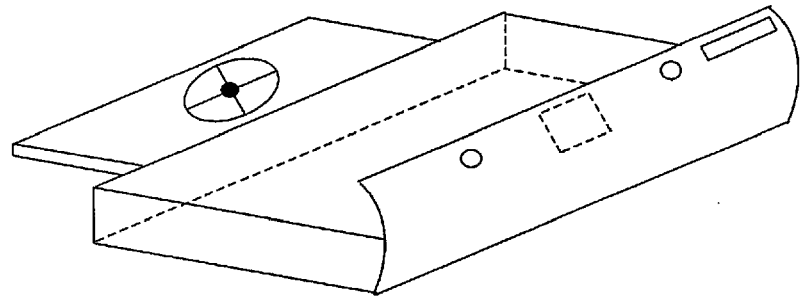

FIGS. 7-9 show a desktop configuration of the endotrainer. Here the display (6) is attached to the front of base (18). Apertures (3) are located in the front of the base for surgical instruments, and the camera (2) is located just behind. The user control panel (4) can be used to control the camera. In FIG. 8, the skills disc (5) is shown inside the base. When the endotrainer is in use, as shown in the configuration of FIG. 9, the disc can be retracted from the back of the base to bring it into view. This can be done manually, or by means of user control panel (4)

Figure 10:
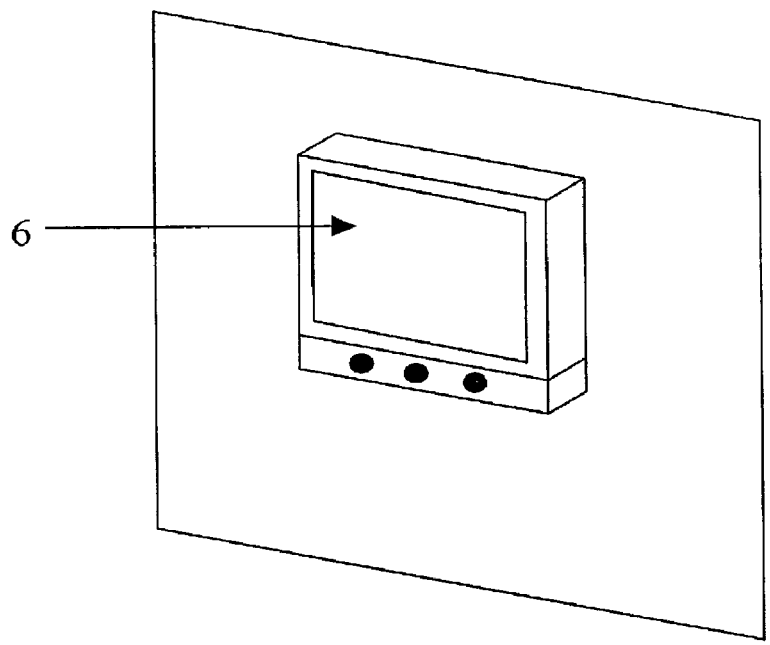
FIGS. 10 and 11 show a wall-mounted configuration of an endotrainer.
Figure 11:
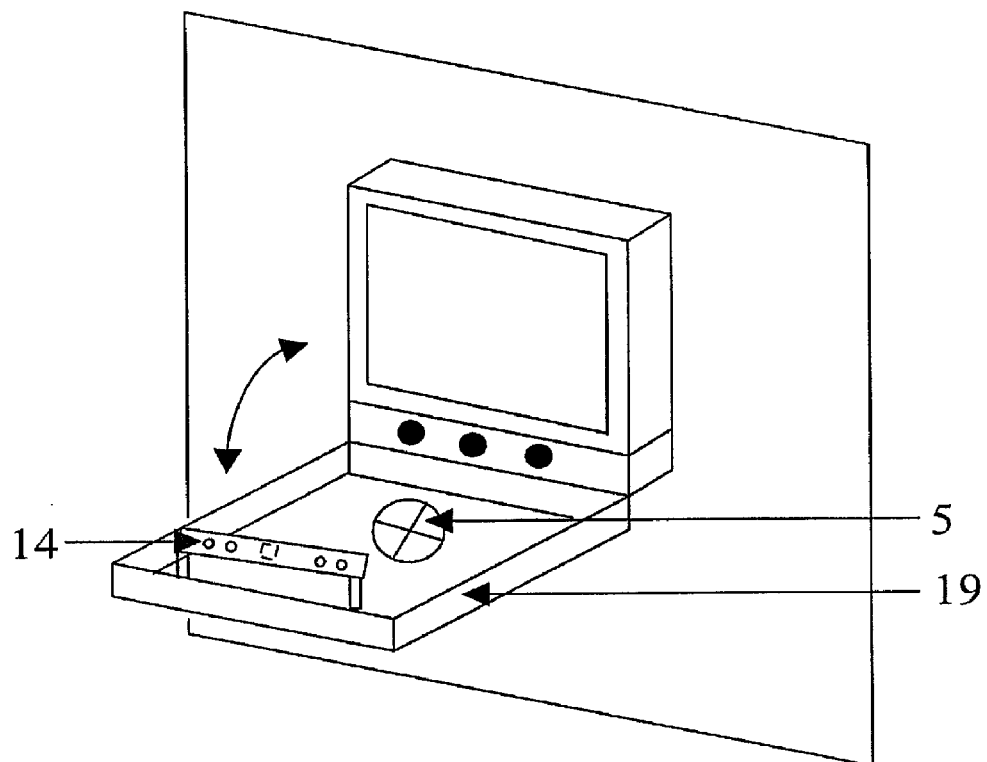

FIGS. 10 and 11 show a wall-mounted configuration of the endotrainer. In FIG. 10 the endotrainer is mounted onto a fixed wall, and the display (6) can be seen. When in use, as in FIG. 11, a work tray (19) can be pulled down from the wall as shown. This contains the skills disc (5), and the endotraining dashboard (14) which can be lifted up from the tray as shown. This same style of endotrainer may also be fixed onto a wheeled stand instead of a wall, to allow the endotrainer to be moved when required.

Figure 12:
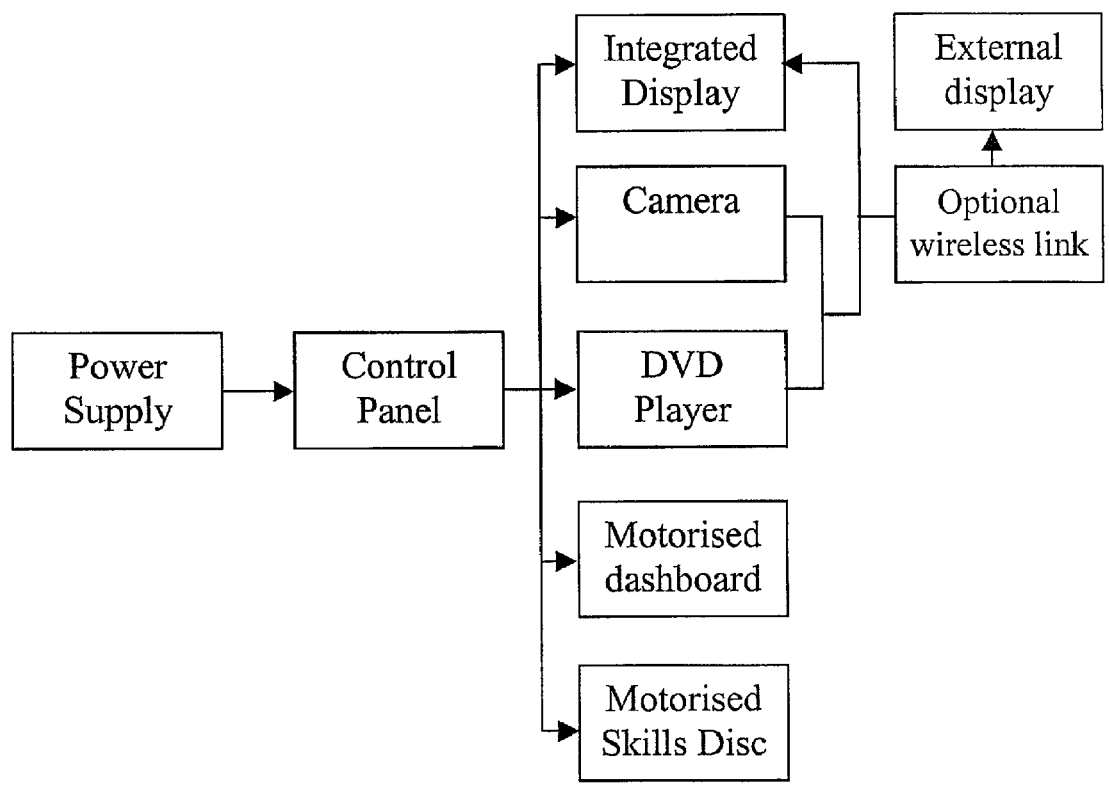
FIG. 12 shows a block diagram of an electronic control system for an endotrainer.

FIG. 12 shows a configuration of the electronic endotrainer components. The control panel may be used to control aspects of the endotrainer, including one or more of display settings, camera zoom, DVD functions, movement of the dashboard and rotation of the skills disc. The camera and DVD player are coupled to the integrated screen. There may also be an additional wireless connection option, to facilitate use of the camera and DVD player with an external display.

Figure 13:
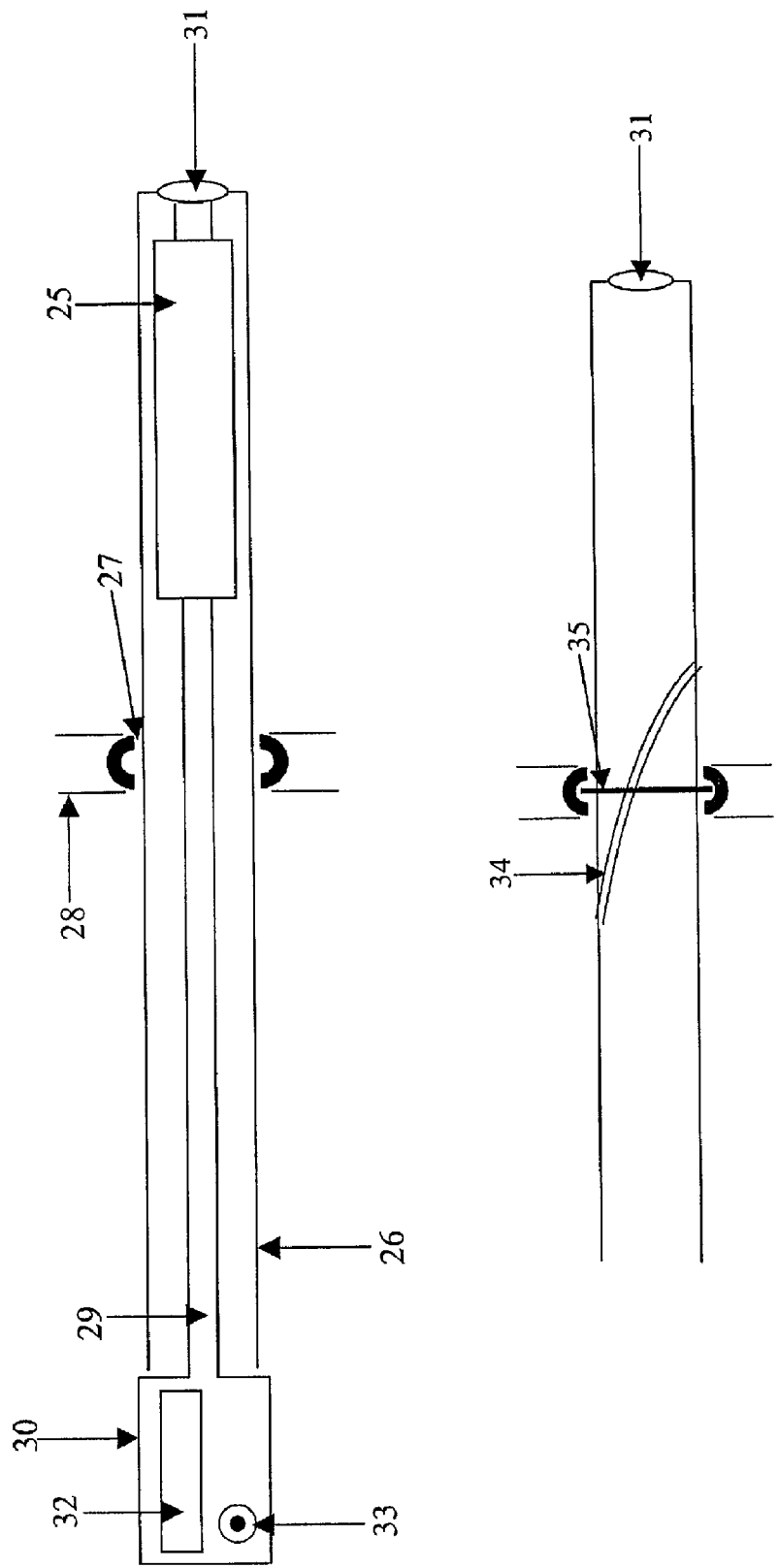
FIG. 13 shows cross-sectional views of an endoscope-type camera suitable for use with an endotrainer.

FIG. 13 shows a simplified endoscope type camera suitable for use with an endotrainer as described above. The camera head (25) is located inside an outer tube-shaped sheath (26). The camera is placed through an aperture (27) in the dashboard (28). The aperture preferably forms a tight seal around the camera (for example by means of a rubber grommet), but allows it to move through and around the aperture. The camera is attached via a rod (29) to an external handle (30). This handle is used to manipulate the camera through the aperture. The outer sheath is attached to the camera lens (31). The sheath can rotate independently of the camera handle to rotate the lens. This can be used to focus the image from the camera as it is moved closer to and further away from the work area of the endotrainer. The endoscope type camera may attach directly to the display screen, or via a wireless transmitter (32). The power for the camera may be provided directly from the endotrainer via a power socket (33).

The endotrainer may include a system for automatically focussing the endoscope type camera as it is moved relative to a workpiece. In one embodiment this system may comprise a spiral slit in the outer sheath (34). A pin is attached to the aperture (35), which engages with the spiral slit. Thus when the camera is moved through the aperture, the outer sheath automatically rotates the lens, and focuses the image from the camera.

Thus we have described a portable (desktop) endotrainer, the endotrainer comprising: a base and a cover mounted on said base, and having at least one aperture for endotraining said cover able to be opened to enable manual access beneath the cover. Preferably the cover is substantially transparent over part or all of its area, to allow entry of light from all sides to reduce shadows in the workspace. In embodiments the cover has a first substantially flat portion spaced along from and substantially parallel to said base, and a second vertical portion, each of said flat and vertical portion having at least one said aperture for endotraining.

The portable endotrainer may further comprise a camera mounted beneath said cover, and a display screen hingedly attached to said cover, and coupled to said camera for displaying an image captured from beneath said cover. Preferably the camera angle and height can be easily adjusted.

In embodiments the workspace incorporates a motorised rotating Skills Disc on which multiple endoscopic surgical techniques can be practiced. In embodiments a button panel allows control of the camera angle and zoom, and rotation of the motorised Skills Disc.

The portable endotrainer may incorporate a DVD player and recorder coupled to the display screen, and/or a personal computer and/or a tray for instruments and accessories. The device may be powered by an in-built rechargeable battery.

In some particularly preferred embodiments the endotrainer is a folding-laptop style device, with a physical configuration similar to a laptop computer. Thus in embodiments the device has the general appearance of a laptop computer: it folds to approximately flat and has at least one, and generally two, flat, fold-up panels, each of a width similar to that of the endotrainer, hinged at opposite edges of the device. One of the panels carries the display; the other provides the dashboard. One of the panels, for example the display panel, provides a lid for the device when folded flat. In embodiments the device has a footprint which is square or rectangular, for example smaller than A2 or A3 size. In embodiments when folded flat the device has a mean height of less than 25%, 20% or 15% of a largest lateral dimension. In embodiments the device may have no cover (at least when in operation). In embodiments a camera bracket incorporates apertures for endotraining. The bracket may be adjusted to any desired angle and height, to allow user to practice in the standing or sitting position.

In a portable endotrainer as described above a rod (or similar endoscope-type) lens may be attached to the camera, or to a further camera, and coupled to the display screen. Such an arrangement is advantageous, for example for an arthotrainer.

We have described endotrainers which are particularly suitable for laparotraining, that is for training in relation to surgery to the abdomen. However embodiments of the endotrainer, in particular those mentioned above employing an endoscope type camera, are also useful for arthroscopy training, that is training for surgery on joints. The skilled person will understand that embodiments of a training device according to the invention may also be employed for training in other types of so-called keyhole surgery.

No doubt many other effective alternatives will occur to the skilled person. It will be understood that the invention is not limited to the described embodiments and encompasses modifications apparent to those skilled in the art lying within the spirit and scope of the claims appended hereto.

I claim:

1. A portable, folding laptop style endotrainer, the endotrainer comprising:
   a base defining a work area for endotraining;
   a camera for viewing said work area;
   one or both of i) a display screen to display an image from said camera said display screen being attached to said base; and ii) a wireless or wired link coupled to said camera for connecting said camera to a display screen;
   a fold-up endotraining dashboard hinged to said base, said endotraining dashboard having at least one portal to enable access of a surgical instrument to said work area; and
   said endotrainer having two configurations, a first, folded configuration in which said endotrainer is folded substantially flat and a second, operational configuration in which said display screen, if present, is unfolded to a viewing position for an operator of said endotrainer and in which said endotraining dashboard is unfolded such that it is displaced away from said base for endotraining;
   wherein said endotraining dashboard is adjustable while said endotrainer is in said second, operational configuration such that an angle of the dashboard, relative to the base, is pivotable to allow a height and an angle of the at least one portal, relative to the base, to be adjusted while the endotrainer remains in the second, operational configuration, wherein at least one moveable arm is located on said endotraining dashboard and is configured to allow adjustment of said endotraining dashboard, said at least one moveable arm being configured to engage said base in one of at least two locations.

2. A portable, folding-laptop style endotrainer as claimed in claim 1, wherein said camera is adjustably mounted on said endotraining dashboard, such that the angle between said camera and said endotraining dashboard is adjustable.

3. A portable, folding-laptop style endotrainer as claimed in claim 1, wherein said endotraining dashboard has at least two said portals.

4. A portable, folding-laptop style endotrainer as claimed in claim 1, wherein said fold-up endotraining dashboard is supported by at least one moveable arm rotatably mounted to said endotraining dashboard.

5. A portable, folding-laptop style endotrainer as claimed in claim 4, wherein said at least one arm is configured to fix or rest in one of two or more grooves or in one of two or more steps of a stepped groove.

6. A portable, folding-laptop style endotrainer as claimed in claim 1, further comprising a platform mounted on said base, said platform being movable in said operational configuration between a first position in which the platform is at an angle with respect to said base and a second, horizontal position.

7. A portable, folding-laptop style endotrainer as claimed in claim 6, wherein said platform is received within a slot in the base to hold it at said angle in said first position.

8. An endotrainer as claimed in claim 1, wherein said camera comprises a 3D camera system to provide a 3D view of a workpiece.

9. An endotrainer as claimed in claim 8, further comprising a 3D image display system.

10. A portable, folding laptop style endotrainer, the endotrainer comprising: a base defining a work area for endotraining;
a camera for viewing said work area;
a display screen to display an image from said camera, said display screen being pivotally attached to a first side of said base; and
a fold-up endotraining dashboard, said endotraining dashboard being pivotally attached to a second side of said base opposite said first side and having at least one portal to enable access of a surgical instrument to said work area; and
said endotrainer having two configurations, a first, folded configuration in which said endotrainer is folded substantially flat and a second, operational configuration in which said display screen is unfolded to a viewing position for an operator of said endotrainer and in which said endotraining dashboard is unfolded such that it is displaced away from said base for endotraining;
wherein said endotrainer has a substantially open top in said second operational configuration, said endotraining dashboard is adjustable while said endotrainer is in said second, operational configuration such that an angle of the dashboard, relative to the base, is pivotable to allow a height and an angle of the at least one portal, relative to the base, to be adjusted while the endotrainer remains in the second operational configuration, wherein at least one moveable arm is located on said endotraining dashboard and is configured to allow adjustment of said endotraining dashboard, said at least one moveable arm being configured to engage said base in one of at least two locations.

11. An endotrainer as claimed in claim 10, wherein the angle between said display and said base is adjustable in said second, operational configuration.

12. An endotrainer as claimed in claim 10, wherein the angle between said endotraining dashboard and said base is adjustable in said second, operational configuration.

13. A portable, folding-laptop style endotrainer as claimed in claim 12, wherein said camera is adjustably mounted on said endotraining dashboard such that the angle between said camera and said endotraining dashboard is adjustable.

14. A portable, folding-laptop style endotrainer as claimed in claim 12, wherein said fold-up endotraining dashboard is supported by at least one moveable arm rotatably mounted to said endotraining dashboard.

15. A portable, folding-laptop style endotrainer as claimed in claim 14, wherein said at least one arm is configured to fix or rest in one of two or more grooves or in one of two or more steps of a stepped groove.

16. A portable, folding-laptop style endotrainer as claimed in claim 10, wherein said endotraining dashboard has at least two said portals.

17. A portable, folding-laptop style endotrainer as claimed in claim 10, further comprising a platform mounted on said base, said platform being moveable in said operational configuration between a first position in which said platform is at an angle with respect to said base and a second, horizontal position.

18. A portable, folding-laptop style endotrainer as claimed in claim 17, wherein said platform is received within a slot in the base to hold it at said angle in said first position.

19. An endotrainer as claimed in claim 10, wherein said camera comprises a 3D camera system to provide a 3D view of a workpiece, the endotrainer further comprising a 3D image display system.

20. A portable, folding laptop style endotrainer, the endotrainer comprising:
a base defining a work area for endotraining;
a camera for viewing said work area;
one or both of i) a display screen to display an image from said camera said display screen being attached to said base; and ii) a wireless or wired link coupled to said camera for connecting said camera to a display screen;
a fold-up endotraining dashboard hinged to said base, said endotraining dashboard having at least one portal to enable access of a surgical instrument to said work area; and
said endotrainer having two configurations, a first, folded configuration in which said endotrainer is folded substantially flat and a second, operational configuration in which said display screen, if present, is unfolded to a viewing position for an operator of said endotrainer;
wherein said endotraining dashboard is adjustable while said endotrainer is in said second, operational configuration such that an angle of the dashboard, relative to the base, is pivotable to allow a height and an angle of the at least one portal, relative to the base, to be adjusted while the endotrainer remains in the second, operational configuration, wherein at least one moveable arm is located on said endotraining dashboard and is configured to allow adjustment of said endotraining dashboard, said at least one moveable arm being configured to engage said base in one of at least two locations.

\* \* \* \* \*